UNITED STATES PATENT OFFICE 2,423,802

PROCESS OF SEPARATING ALPHA METHYL STYRENE FROM A MIXTURE CONTAINING CUMENE

Ober C. Slotterbeck, Clark Township, Union County, and Charles E. Morrell, Westfield, N. J., assignors to Standard Oil Development Company, a corporation of Delaware No Drawing. Application December 30, 1944, Serial No. 570,746

3 Claims. (Cl. 260—669)

This invention relates to the separation and concentration of an alpha alkyl styrene from mixtures of hydrocarbons and particularly to the separation and concentration of an alpha alkyl styrene by aralkylating a phenolic compound capable of reacting with an alpha alkyl styrene and regenerating.

It is desirable to obtain a separation and concentration of alpha alkyl styrenes from mixtures of other hydrocarbons, including paraffins, alkyl aromatics, unsaturated aromatics, and unsaturated compounds in general which are essentially free of tertiary carbon atoms. These alpha alkyl styrenes include not only alkyl methyl styrene but also alpha ethyl, -propyl, -isopropyl, -isoamyl, etc. Furthermore, the aromatic nucleus may contain, besides any one of the alkenyl groups described above, one or other substituents such as alkyl groups, for instance, methyl, ethyl, propyl, etc., chlorine, bromine, cyanide, nitro, phenol and alkyl phenol. The separation of p-methyl, alpha methyl styrene, ortho-methyl, alpha-methyl styrene, and also styrenes which would be derived by ethylating the xylenes separately or in a mixture and subsequently dehydrogenating these ethyl xylenes is desirable.

For example, in the manufacture of synthetic polymers where alpha methyl styrene is polymerized, cumene (isopropyl benzene) is generally a chief contaminant and due to the presence of cumene an inferior product is obtained. Various methods have been tried for the separation and concentration of alpha methyl styrene such as fractionation and crystallization.

The separation of an alpha methyl styrene-cumene mixture by fractionation is possible but to obtain a product of desired purity a tower with a large number of plates, high reflux ratios, high heat and cooling water is required. In general the use of vacuum to prevent extensive polymerization of the styrene is essential. Therefore, while it is possible to obtain a separation of alpha methyl styrene by fractionation, the expense of fractionating is relatively high and where an alpha alkyl styrene of higher molecular weight is to be separated, fractionation is not feasible.

The attempt to separate alpha methyl styrene from cumene by crystallization did not prove to be very practical even though alpha methyl styrene has a melting point 76° C. higher than that of cumene, that is −20 vs. −96° C. The following data indicate the separation as it came:

*Separation of alpha methyl styrene from cumene by crystallization*

| Sample | Solvent | HC/Solvent Ratio | Temp., °C. | Per cent Alpha Methyl Styrene | |
|---|---|---|---|---|---|
| | | | | Filtrate | Crystals |
| 37.5% Alpha Me Styrene | None | | −58 | 28.5 | 46.0 |
| 63% Alpha Me Styrene | do | | −50 | 41.5 | 67.5 |
| 63% Alpha Me Styrene | MeOH | ½ | −50 | 39.5 | 70.2 |
| 37.5% Alpha Me Styrene | None | | −50 | | [1] 90.5 |

[1] Crystals were worked with cold isopentane.

The separation of the cumene from the alpha methyl styrene crystals together with the poor recovery due to the high solubility of the alpha methyl styrene crystals in cumene makes the process unattractive even for small scale laboratory purification.

According to this invention a phenolic compound capable of reaction with an alpha alkyl styrene, for example cresol, is aralkylated with alpha methyl styrene in the presence of toluene sulfonic acid catalyst and regenerated at elevated temperatures. The aralkylated cresol was separated from the cumene at reduced pressures of 30–40 mm. in the presence of a catalyst or at atmospheric pressure if the catalyst is neutralized prior to separation at a temperature of 80°–90° C. Some serious difficulties have been experienced when the catalyst was neutralized with 10% caustic but the addition of ammonia gas in place of the caustic for neutralization of the catalyst eliminated this difficulty. After the cumene has been separated from the aralkylate the alpha methyl styrene can be regenerated at 150°–200° C. from the aralkylate in the presence of the catalyst. This process may be carried out in a fractionating column by passing overhead the regenerated styrene from the cresol which has a boiling point of 202° C. If a fractionating column is not used a caustic treat is necessary to remove the small amount of cresol taken overhead with the vapors. The following table summarizes a number of experiments showing the separation of alpha methyl styrene from cumene by cresol aralkylation.

Separation of alpha methyl styrene from cumene by cresol aralkylation

| Run No. | Per cent Alpha Me Styrene In Crude | Mol Ratio Alpha Me Styrene/Cresol | Mol Per cent [1] TSA | Aralkylation | | Per cent Alpha Me Styrene Reacted | Per cent Alpha Me Styrene Regenerated | Per cent [2] Purity |
|---|---|---|---|---|---|---|---|---|
| | | | | °C. | Time, Hours | | | |
| 1 | 46.5 | 1/1 | 0.5 | 98–100 | 1 | 93 | 40 | |
| 2 | 46.5 | 1/1 | 0.5 | 98–100 | 1½ | 95.4 | 60.5 | 94 |
| 3 | 67.5 | 1/1 | 0.5 | 98–100 | 2 | 90 | 70.0 | 90 |
| 4 | 65.0 | 1/1 | 0.5 | 98–100 | 2 | 92.5 | 69.0 | 98 |
| 5 | 65.0 | 1/1 | 0.1 | 35–40 | 3 | 84 | 84.0 | [3] 100 |
| 6 | 65.0 | 1/1 | 0.1 | 35–40 | 3 | 87.5 | 85.7 | [4] 97.5 |

[1] Toluene sulfonic acid catalyst based on Cresol.
[2] Per cent methyl styrene in regenerated product.
[3] In this run, the catalyst was neutralized with 10% caustic prior to distilling off the cumene at atmospheric pressure.
[4] Cumene was taken overhead under reduced pressure. Catalyst was not neutralized.

In the first four runs, it appears that considerable polymerization of the methyl styrene took place during the aralkylation step as evidenced by the low yield of regenerated product. When the aralkylation temperature was reduced from 100° C. to 35–40° C. and the catalyst concentration reduced from 0.5 to 0.1 mol per cent, as shown in runs 5 and 6, the alpha methyl styrene polymerization was reduced to a minimum. The regenerated alpha methyl styrene was of the desired purity.

Only cresols are shown above as the concentrating agent. While this particular mixture of phenols is probably the most practical one, other phenols may be used. The lowest homolog, phenol itself, could be used, although this in general may involve the reaction of more than one styrene molecule with one molecule of phenol. Similarly, ordinary phenol partially reactive with the alpha methyl styrene may be used in the concentration process. Xylenols may also be used as well as the mixed phenols derived from petroleum sources by caustic extraction.

The catalyst used may include not only such acid catalysts as sulfuric acid, phosphoric acid, aromatic sulfonic acids, but also the methyl halide catalysts such as aluminum chloride, boron chloride, stannic chloride, etc.

It is desirable to use a phenol which, after decomposition of the addition product, has a higher boiling point than the particular styrene being concentrated. This is the case when using cresols and alpha methyl styrene. However, in certain instances, especially when dealing with highly alkylated aromatic rings, it might be necessary, or even desirable, to boil overhead the phenol from the regenerated styrene in the decomposition step.

What is claimed is:

1. The process of separating alpha methyl styrene from a mixture containing cumene, which comprises aralkylating cresol by reaction with alpha methyl styrene in the mixture, separating the thus-aralkylated cresol from unreacted cumene, and heating the aralkylated cresol separated from the cumene to a temperature sufficiently high to evolve alpha methyl styrene vapors.

2. Process for the separation of alpha methyl styrene from a mixture containing cumene which comprises catalytically aralkylating cresol by reaction with alpha methyl styrene in the mixture, distilling cumene from the resulting mixture containing aralkylated cresol under a reduced pressure, heating the aralkylated cresol to a temperature in the range of 150° C. to 200° C., and distilling alpha methyl styrene from the thus-heated aralkylated cresol.

3. The process of separating alpha methyl styrene from a mixture containing cumene which comprises adding cresol to the mixture, aralkylating cresol in the mixture by reaction with alpha methyl styrene in the presence of an acid catalyst, neutralizing said acid catalyst in the mixture, separating cumene from the resulting mixture containing the neutralized catalyst and aralkylated cresol, adding to said resulting mixture a quantity of the acid catalyst, then heating the said resulting mixture and distilling therefrom alpha methyl styrene.

OBER C. SLOTTERBECK.
CHARLES E. MORRELL.

REFERENCES CITED

The following references are of record in the file of this patent:

UNITED STATES PATENTS

| Number | Name | Date |
|---|---|---|
| 2,265,583 | Stevens et al. | Dec. 9, 1941 |
| 2,005,042 | Krey | June 18, 1935 |

FOREIGN PATENTS

| Number | Country | Date |
|---|---|---|
| 698,643 | Germany | Nov. 14, 1940 |